United States Patent Office 2,956,024
Patented Oct. 11, 1960

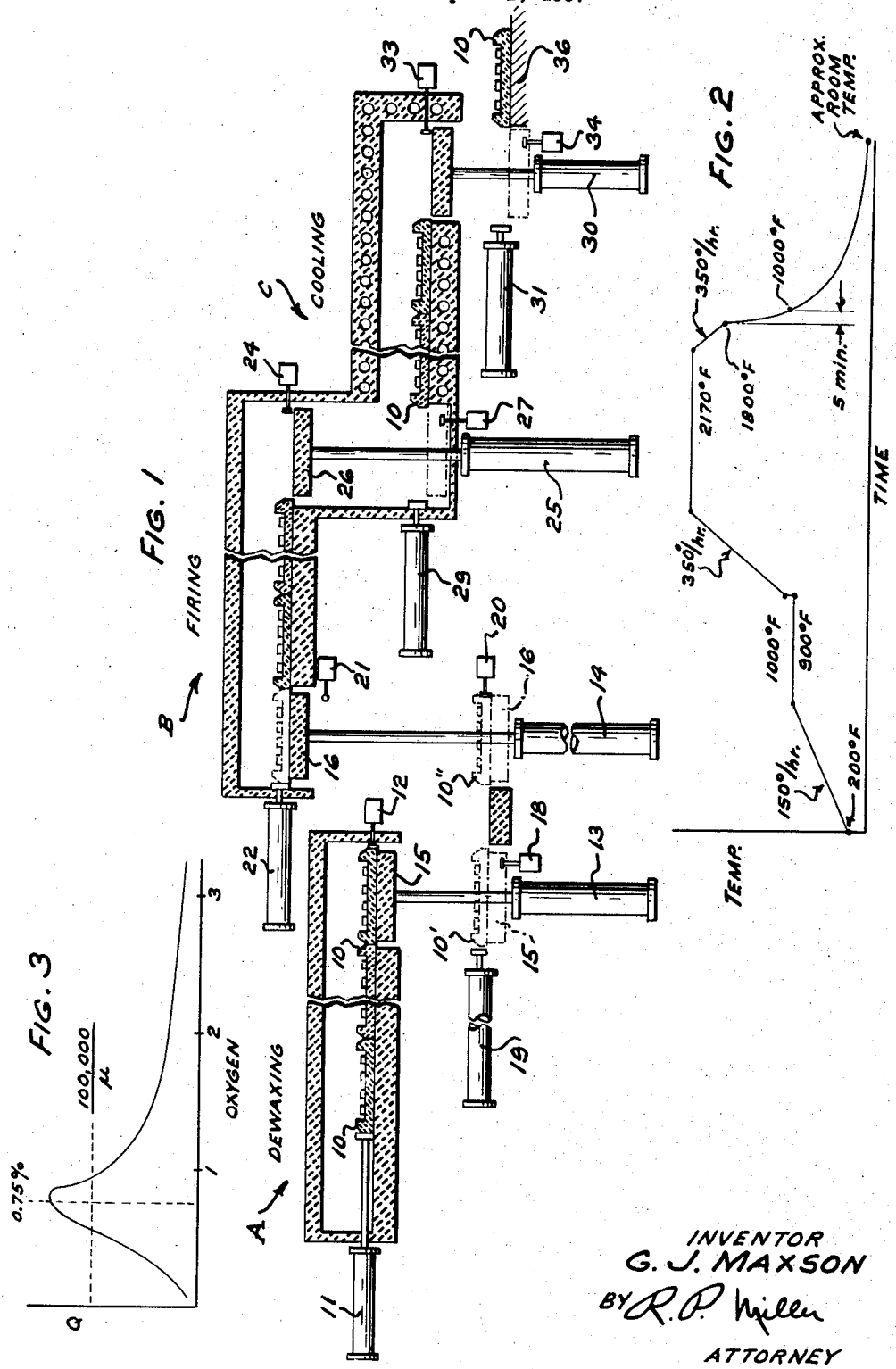

2,956,024

METHOD OF MAKING MAGNETIC CORES

Gordon J. Maxson, Downers Grove, Ill., assignor to Western Electric Company, Incorporated, New York, N.Y., a corporation of New York Filed Apr. 1, 1957, Ser. No. 650,049

2 Claims. (Cl. 252—62.5)

This invention relates to a method of making magnetic cores, and more particularly to a method of making manganese zinc ferrite cores.

Ferromagnetic oxide compounds, commonly called ferrites, have come into wide use in the past few years in the making of cores for inductance coils, radio frequency transformers, and various other applications. Ferrites are made by sintering iron oxide with one or more oxides or carbonates of bivalent metals to produce a crystalline material having magnetic properties. To produce materials having good magnetic properties, the ingredients must be meticulously prepared and fired. It has been found that the selection and preparation of the constituents alone does not completely control the magnetic properties of the final product; the firing process is also of critical importance. For example, a firing time which is too short will result in a low permeability ($\mu$) whereas a firing time which is too long will result in a low Q factor.

It has been determined that manganese zinc ferrites, when properly prepared and fired, exhibit very high permeability and Q factor values, and consequently, a very high $\mu$Q product. Experiments have demonstrated that the composition of a manganese zinc ferrite which exhibits the optimum values of the $\mu$Q product is one in which the three metallic elements are present in the final compound in the following percentages by weight of the total metal:

| | Percent |
|---|---|
| Iron | 66.10 |
| Manganese | 16.34 |
| Zinc | 17.56 |

It is therefore an object of this invention to provide a process which will produce ferrites having a high $\mu$Q product.

It is another object of this invention to provide a firing process which will produce manganese zinc ferrites having very high permeability ($\mu$) and Q factor values.

It is another object of this invention to provide a process which will produce manganese zinc ferrites containing weights of the constituent metals in accordance with the above percentages.

It is yet another object of this invention to produce manganese zinc ferrites which will exhibit values of $\mu$ and Q that provide a product well in excess of 100,000 when subjected at room temperature (70 to 95° F.) to a maximum flux density of 5 gausses varying at a frequency of 100 kilocycles.

With the foregoing and other objects in mind, the invention is directed primarily to methods of producing a manganese zinc ferrite article having a $\mu$Q product in excess of 100,000 when subjected to a flux density of 5 gausses at a frequency of 100 kilocycles. A method, illustrating certain features of the invention, may include the steps of forming an intimate mixture of 23.8 percent $MnCO_3$ by weight, 14.4 percent ZnO, and 61.8 percent $Fe_2O_3$, adding a chlorinated naphthalene binder, and forming a compressed article from the mixture. The article thus formed is then heat treated according to a schedule including the steps of (1) heating the article to volatilize the binder, (2) without appreciable temperature drop after the volatilization step sintering the article at a temperature of about 2170° F. in a protective atmosphere consisting of 99.25 percent nitrogen and 0.75 percent oxygen, (3) reducing the temperature of the article to about 1800° F. at a maximum rate of 350° F. per hour, (4) quenching said article to a temperature of about 1000° F. within about 5 minutes with a cool supply of said protective atmosphere, and (5) slowly cooling said article to room temperature with an additional supply of said atmosphere.

Other objects, advantages and novel features of the invention will become apparent upon consideration of the following detailed description in conjunction with the accompanying drawings wherein:

Fig. 1 is a side elevation view of a heat zoned tunnel type furnace used in practicing the invention;

Fig. 2 is a temperature vs. time graph of the dewaxing and firing process; and

Fig. 3 is a graph of Q factor vs. percent of oxygen present in the protective atmosphere during the firing operation.

An actual procedure that was utilized for producing magnetic bodies having the above-described constituents and magnetic properties was as follows. Three lots of raw materials consisting respectively of iron oxide, zinc oxide, and manganese carbonate, all of reagent grade, were assayed and the following compositions were found:

| Compound: | Percent metal |
|---|---|
| $Fe_2O_3$ | 69.86 |
| ZnO | 79.53 |
| $MnCO_3$ | 44.93 |

The next step was to obtain the ratio of the percentage by weight of total metal desired for each element to the percentage by weight of total metal as obtained for each raw material through the chemical analysis. The quotients of these ratios for the three elements were then added and each quotient divided by the total. The resulting percentages were then multiplied by the size of mix desired to obtain individual weights of raw materials to be used. These calculations are shown below.

$$\frac{\text{Iron}}{\text{Oxide}} \frac{66.10}{69.86} = .947 \div 1.531 \times 100 = 61.8\% \times 40 \text{ lb. mix} = 24.74 \text{ lb.}$$

$$\frac{\text{Zinc}}{\text{Oxide}} \frac{17.56}{79.53} = .220 \div 1.531 \times 100 = 14.4\% \times 40 \text{ lb. mix} = 5.76 \text{ lb.}$$

$$\frac{\text{Manganese}}{\text{Carbonate}} \frac{16.34}{44.93} = .364 \div 1.531 \times 100 = 23.8\% \times 40 \text{ lb. mix} = 9.50 \text{ lb.}$$

$$\overline{1.531}$$

The raw materials were then weighed out in accordance with the calculated proportions and mixed with water for 20 minutes to form a homogeneous slurry. The slurry was then filtered and air dried for 20 minutes to form filter cakes. The filter cakes were next oven dried at 350° F. for 4 hours and then granulated by means of a granulator utilizing an agitator and a ¼ inch mesh screen. The granules were then loaded into quartz saggers and placed in a preliminary firing or calcining furnace which was preheated to a temperature of 1750° F. After 4 hours in the furnace, the saggers were removed and air cooled. This step causes most of the shrinkage, which the materials will undergo, to take place and also reduces the $MnCO_3$ to $MnO$ and $CO_2$ which passes off as a gas. Also, the chemical reaction between the raw materials is partially completed and some ferrite is formed.

The calcined powder was next mixed with carbon tetrachloride and "Halowax" (a chlorinated naphthalene) and ground in a ball mill for 22 hours. The $CCl_4$ was added to provide a liquid vehicle for a wet grinding operation and then the "Halowax" was added and thoroughly mixed with the powder in order to serve as a binder in a subsequent pressing operation. The $CCl_4$ was then removed by fractional distillation leaving the powder impregnated with the "Halowax." The lumps of powder resulting from the previous step were then reduced in a granulator using ⅛ inch mesh screens and then aged for 10 days at room temperature. The powder was then pressed into appropriately shaped articles using tungsten carbide dies and a pressure of 25 tons/in.² The articles were then ready to be dewaxed.

Referring now to the drawings, there can be seen a furnace (Fig. 1) formed of three sections, namely, dewaxing, firing and cooling sections denoted by the reference letters A, B and C. In using this furnace the previously pressed articles are loaded into mullite (aluminum silicate) saggers 10 and the saggers in turn are placed in the left hand end (Fig. 1) of the dewaxing section at spaced intervals. A solenoid valve (not shown) is then energized to actuate a pneumatic cylinder 11 to cause the saggers 10 within the dewaxing section to be moved to the right. When sufficient saggers are present in the dewaxing section, the one on the right hand end trips a limit switch 12 which energizes a solenoid valve (not shown) to actuate pneumatic cylinders 13 and 14 which lower platforms 15 and 16 to the positions shown by dotted lines. Platform 15 trips limit switch 18 to actuate cylinder 19 which in turn pushes the loaded sagger 10' onto platform 16 in the position designated by the numeral 10". When the sagger reaches the position 10", limit switch 20 is tripped causing cylinder 14 to elevate platform 16 to the position shown in solid lines; at which point the sagger enters the firing section B of the furnace.

As platform 16 is being elevated, it trips limit switch 21 to actuate cylinder 22 which pushes the sagger or saggers, within the firing section B, to the right (Fig. 1). When the firing section is loaded, the advance of the right hand sagger will trip limit switch 24 each time cylinder 22 is actuated. Switch 24 functions to actuate cylinder 25 which lowers platform 26 to trip limit switch 27. Switch 27 then causes cylinder 29 to push a sagger 10 resting on platform 26 into the cooling section C of the furnace. The loaded saggers progress through the cooling section of the furnace, as a result of the cooperation of cylinders 29, 30 and 31 and limit switches 33 and 34, in the same manner as that in which they passed through the firing section and are eventually deposited upon bench 36 when sufficiently cooled. It is obvious, of course, that cylinders 11, 22, 29 and 31 must all function successively at the same frequency.

Returning now to the actual procedure which was utilized to produce ferrite articles, there can be seen in Fig. 2 a temperature vs. time graph of the dewaxing, firing and cooling cycle used in preparing ferrites according to the invention. The saggers containing the pressed articles were subjected to a temperature of 200° F. immediately upon being placed in the left hand end of the dewaxing section A. The temperatures of the various zones of the dewaxing section, the frequency of introduction of additional saggers and the length of the dewaxing section were predetermined so as to subject the pressed articles to a temperature rise of approximately 150° F./hr. and to then maintain the articles at 900° F. for approximately 4 hours. An exhaust system (not shown) was provided to continuously change the air atmosphere within the dewaxing section in order to carry off the volatilized binder (Halowax). Upon completion of this heating cycle, the saggers were then periodically transfered to the firing section B of the furnace. The transfers were rapidly effected to insure a minimum drop of temperature of the articles.

The left hand zone of the firing section B was maintained at 1000° F. in order to begin heating the articles still further upon their introduction into the firing section. The zone temperatures, indexing frequency and length of the firing section were predetermined so as to provide the following firing cycle, (1) a gradual temperature rise from 1000° F. to 2170° F. at a rate of approximately 350° F./hr., (2) a constant firing temperature of 2170° F. for 6 hours, and (3) a gradual cooling from 2170° F. to 1800° F. at the rate of approximately 350° F./hr. A continuously changing protective atmosphere was maintained in the firing section consisting of 99.5% to 99.25% nitrogen with the remainder being oxygen. It was experimentally determined that the amount of oxygen present in the atmosphere surrounding the articles being fired had a decided effect on the Q factor of the completed articles (Fig. 3), i.e. a higher or lower percentage of oxygen present would drastically lower the Q factor. An oxygen content of approximately 0.75% was found to produce optimum results.

After cooling from the firing temperature of 2170° F. to 1800° F., the saggers were transferred to the cooling section C of the furnace where they were subjected to a cool protective atmosphere of the above-described composition which quenched the articles and reduced their temperature from 1800° F. to 1000° F. in about 5 minutes. The purpose of this rapid quench was to preserve the magnetic properties of the finished articles since it was found that permitting the articles to cool slowly resulted in very low and unsatisfactory values of $\mu$ and Q.

The articles were then more slowly cooled to a temperature at which they could be safely handled and were then ejected from the cooling section. When the articles made in accordance with the described process were subjected to a flux density of 5 gausses at a frequency of 100 kilocycles, the articles exhibited values of permeability ($\mu$) and Q factor which yielded a $\mu Q$ product averaging 150,000.

There have thus been described improved ferrite materials exhibiting unexpected improvements in several of their useful magnetic properties. The proportions of the ingredients used and the firing steps described should, in general, be closely adhered to since substantial variations will yield products which are either not significantly improved or are inferior to previously known ferrites.

It is to be understood however that the above described method is simply illustrative of an application of the principles of the invention and that modifications can be made without departing from the invention.

What is claimed is:

1. A method of producing a manganese zinc ferrite article having a $\mu Q$ product in excess of 100,000 when subjected to a flux density of 5 gausses at a frequency of 100 kilocycles which comprises the steps of forming an intimate mixture of 23.8 percent $MnCO_3$ by weight, 14.4 percent $ZnO$, and 61.8 percent $Fe_2O_3$, adding a chlorinated naphthalene binder, forming a compressed article from said mixture, heating said article to volatilize said binder, without appreciable temperature drop after the volatilization step sintering said article at a temperature of about 2170° F. in a protective atmosphere consisting of 99.25 percent nitrogen and 0.75 percent oxygen, reducing the temperature of said article to about 1800° F. at a maximum rate of 350° F. per hour, quenching said article to a temperature of about 1000° F. within about 5 minutes with a cool supply of said protective atmosphere, and slowly cooling said article to room temperature with an additional supply of said atmosphere.

2. A method of producing a manganese zinc ferrite article exhibiting a $\mu Q$ product characteristic in excess of 100,000 when subject to a flux density of 5 gausses at a frequency of 100 kilocycles which comprises the steps of forming an intimate mixture of 23.8 percent $MnCO_3$, 14.4 percent $ZnO$, and 61.8 percent $Fe_2O_3$, all of said percentages being by weight, adding a chlorinated naphthalene binder, forming a compressed article from said mixture, heating said article to a temperature of about 900° F. at a maximum rate of 150° per hour, maintaining said article at about 900° F. for approximately 4 hours to volatilize and drive off said binder, increasing the temperature of said article to about 2170° F. at a maximum rate of 350° F. per hour while maintaining a protective atmosphere about said article which consists of 99.25 percent nitrogen and 0.75 percent oxygen, the last-mentioned heating step being performed immediately after the volatilization step so that there is no appreciable temperature drop below 900° F., sintering said article at about 2170° F. for approximately 6 hours while continuing to supply said protective atmosphere, reducing the temperature of said article to about 1800° F. at a maximum rate of 350° per hour, quenching said article to a temperature of approximately 1000° F. within a period of about 5 minutes with a cool supply of said protective atmosphere, and slowly cooling said article to room temperature with an additional supply of said atmosphere.

References Cited in the file of this patent

UNITED STATES PATENTS

| 2,723,238 | Simpkiss | Nov. 8, 1955 |
| 2,764,552 | Buckley et al. | Sept. 25, 1956 |

FOREIGN PATENTS

| 669,571 | Great Britain | Apr. 2, 1952 |
| 730,703 | Great Britain | May 25, 1955 |
| 1,056,511 | France | Oct. 21, 1953 |

OTHER REFERENCES

New Developments in Ferromagnetic Materials, by Snoek, Elsevier Pub. Co., 1947, pp. 91 and 92.

"Proceedings of the IRE," vol. 44, No. 10, October 1956, pp. 1304, 1305 and 1307.